United States Patent
Chen et al.

(10) Patent No.: US 8,043,530 B2
(45) Date of Patent: Oct. 25, 2011

(54) FUEL REFORMER CATALYST

(75) Inventors: Laiyuan Chen, Broken Arrow, OK (US); Jeffrey G. Weissman, Broken Arrow, OK (US)

(73) Assignee: Umicore G & Co. KG, Hanau (DE)

( * ) Notice: Subject to any disclaimer, the term of this patent is extended or adjusted under 35 U.S.C. 154(b) by 0 days.

(21) Appl. No.: 12/762,564

(22) Filed: Apr. 19, 2010

(65) Prior Publication Data
US 2010/0196770 A1    Aug. 5, 2010

Related U.S. Application Data

(63) Continuation of application No. 11/398,003, filed on Apr. 5, 2006, now abandoned.

(51) Int. Cl.
*C01B 3/38*    (2006.01)

(52) U.S. Cl. ........ 252/373; 502/327; 502/103; 423/654; 423/650

(58) Field of Classification Search ............... 429/425; 423/400, 594.15, 628, 650–654; 502/325–332, 502/20; 252/373
See application file for complete search history.

(56) References Cited

U.S. PATENT DOCUMENTS

| | | | |
|---|---|---|---|
| 3,206,391 A * | 9/1965 | Gutberlet et al. | 208/110 |
| 3,278,452 A | 10/1966 | Vorum | |
| 3,630,885 A | 12/1971 | Egan | 208/59 |
| 3,886,260 A * | 5/1975 | Unland | 423/213.5 |
| 3,914,376 A | 10/1975 | Barker | 423/213.5 |
| 3,953,363 A * | 4/1976 | Yamauchi et al. | 502/178 |
| 4,091,072 A * | 5/1978 | McArthur | 423/213.5 |
| 4,110,198 A * | 8/1978 | Hayes et al. | 208/111.1 |
| 4,115,255 A * | 9/1978 | Hayes et al. | 208/143 |
| 4,288,347 A | 9/1981 | Rabinovich et al. | 502/223 |
| 4,622,308 A | 11/1986 | Koikeda et al. | 502/66 |
| 5,358,631 A * | 10/1994 | Miller et al. | 208/138 |
| 5,612,012 A * | 3/1997 | Soma et al. | 423/246 |
| 6,235,673 B1 * | 5/2001 | Zoeller et al. | 502/159 |
| 6,361,757 B1 * | 3/2002 | Shikada et al. | 423/651 |
| 6,579,510 B2 * | 6/2003 | Keller et al. | 423/573.1 |
| 6,702,960 B1 * | 3/2004 | Schaddenhorst et al. | 252/373 |
| 6,832,473 B2 | 12/2004 | Kupe et al. | |
| 6,846,471 B2 * | 1/2005 | Hotta et al. | 423/239.1 |
| 6,878,667 B2 * | 4/2005 | Gaffney et al. | 502/241 |
| 7,138,101 B2 * | 11/2006 | Keller et al. | 423/573.1 |
| 7,147,680 B2 * | 12/2006 | Taguchi et al. | 48/61 |
| 7,166,268 B2 * | 1/2007 | Fukunaga | 423/651 |
| 2002/0177628 A1 * | 11/2002 | Gaffney et al. | 518/703 |
| 2003/0082088 A1 * | 5/2003 | Barelko et al. | 423/327.1 |
| 2004/0014600 A1 * | 1/2004 | Fukunaga | 502/304 |
| 2004/0166396 A1 * | 8/2004 | Gorer | 429/40 |
| 2005/0260123 A1 * | 11/2005 | Deluga et al. | 423/652 |
| 2006/0045843 A1 * | 3/2006 | Chen et al. | 423/651 |
| 2006/0051275 A1 * | 3/2006 | Ramani et al. | 423/224 |
| 2007/0111884 A1 * | 5/2007 | Chen et al. | 502/303 |
| 2008/0224097 A1 * | 9/2008 | Fujie et al. | 252/373 |

FOREIGN PATENT DOCUMENTS

EP      864354 A1    9/1998

* cited by examiner

*Primary Examiner* — Stuart Hendrickson
*Assistant Examiner* — Richard M Rump
(74) *Attorney, Agent, or Firm* — Smith, Gambrell & Russell, LLP

(57) ABSTRACT

A fuel reformer catalyst includes a substrate, and disposed thereon a carrier and combination of at least two metals selected from the group consisting of Rh, Ni, Ir, Pd, Pt, Au, and combinations thereof. Rh is present in the catalyst in an amount not exceeding about 0.5 wt. %, based on the total combined weight of the metals and carrier.

17 Claims, 1 Drawing Sheet

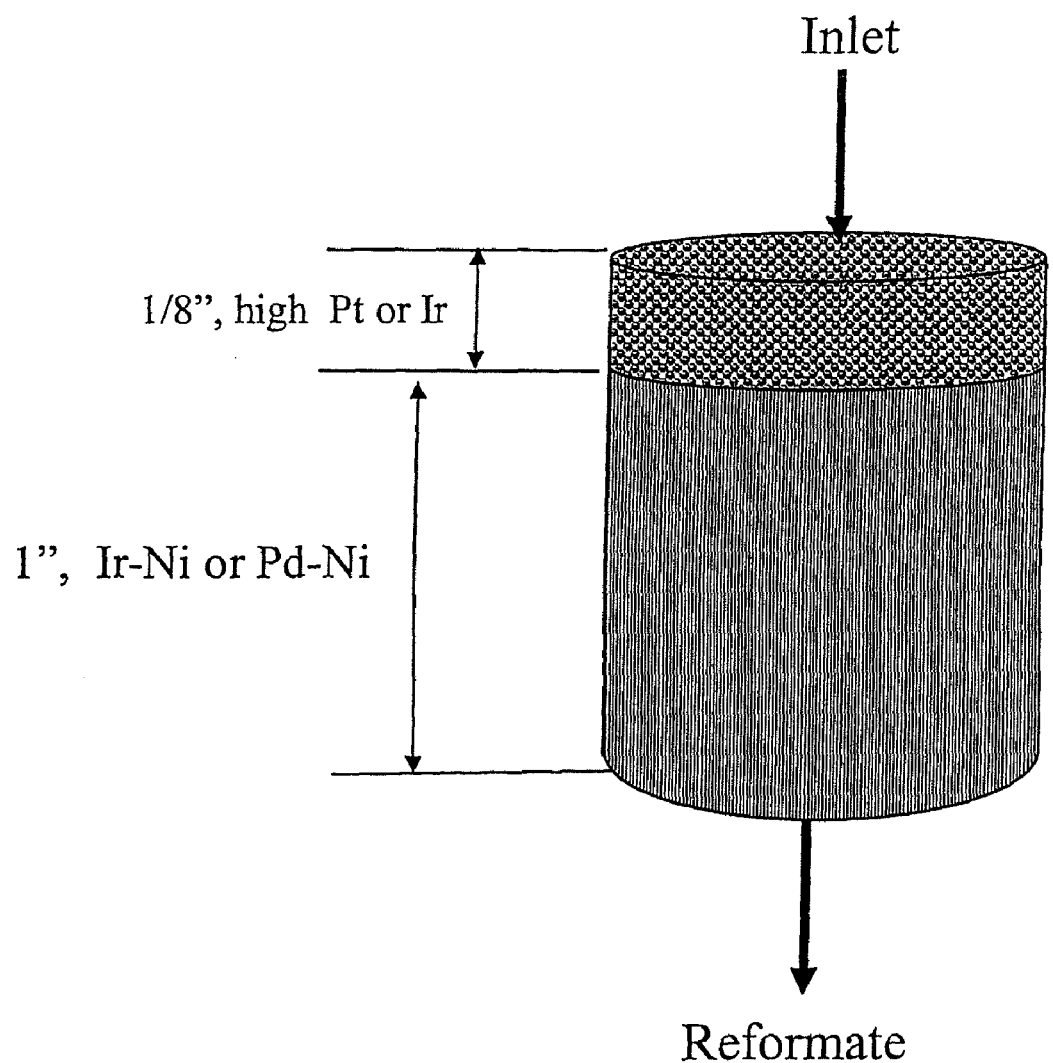

FUEL REFORMER CATALYST

CROSS REFERENCE TO RELATED APPLICATIONS

This application is a continuation of U.S. patent application Ser. No. 11/398,003, filed 5 Apr. 2006, now abandoned, which is being incorporated by reference in its entirety.

TECHNICAL FIELD

The present invention relates to fuel reforming, in particular the production of hydrogen-rich gaseous products from hydrocarbons and an oxidant, and most particularly to catalysts to facilitate the formation of such products.

BACKGROUND OF THE INVENTION

Tighter emission standards and significant innovation in catalyst formulations and engine controls has led to dramatic improvements in the low emission performance and robustness of gasoline and diesel engine systems. However, many technical challenges remain to make the conventionally fueled internal combustion engine a nearly zero emission system having the efficiency necessary to make the vehicle commercially viable.

The automotive industry has made very significant progress in reducing automotive emissions in both the mandated test procedures and the "real world". This has resulted in some added cost and complexity of engine management systems, yet those costs are offset by other advantages of computer controls: increased power density, fuel efficiency, drivability, reliability and real-time diagnostics. However future initiatives to require zero emission vehicles are likely to provide smaller environmental benefits at a very large incremental cost. Even so, an "ultra low emission" certified vehicle may emit high emissions in limited extreme ambient and operating conditions or with failed or degraded components, and especially during cold start.

One approach to addressing the issue of emissions is the employment of fuel cells, particularly solid oxide fuel cells (SOFC), in an automobile as either a primary or secondary source of power. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. SOFCs are constructed entirely of solid-state materials, utilizing an ion conductive oxide ceramic as the electrolyte. An electrochemical cell in a SOFC may comprise an anode and a cathode with an electrolyte disposed there between. The oxidant passes over the oxygen electrode (cathode) while the fuel passes over the fuel electrode (anode), generating electricity, water, and heat. The use of the SOFC, and fuel cells in general, reduce emissions through their much greater efficiency, and so require less fuel for the same amount of power produced, as compared to conventional hydrocarbon fueled engines. Additionally, a fuel cell may be employed to supplement a conventional engine; in this way the engine may be optimized for primary traction power, while the fuel cell may provide other power needs for the vehicle, i.e. air-conditioner, communication and entertainment devices. The fuel reformer-fuel cell system may be operated while the engine is off, permitting electrically powered devices to operate, thereby further reducing emissions by providing power using a more fuel efficient fuel cell to meet the vehicle operator's needs.

To facilitate the production of electricity by the SOFC, a direct supply of simple fuel, e.g., hydrogen, carbon monoxide, and/or methane is preferred. However, concentrated supplies of these fuels are generally expensive and difficult to supply. Therefore the fuel utilized may be obtained by processing a more complex fuel source. The actual fuel utilized in the system is chosen based upon the application, expense, availability, and environmental issues relating to the fuel. Possible fuels include hydrocarbon fuels, including, but not limited to, liquid fuels, such as gasoline, diesel fuel, ethanol, methanol, kerosene, and others; gaseous fuels, such as natural gas, propane, butane, and others; "alternative" fuels, such as biofuels, dimethyl ether, and others; synthetic fuels, such as synthetic fuels produced from methane, methanol, coal gasification or natural gas conversion to liquids, and combinations comprising at least one of the foregoing methods, and the like, as well as combinations comprising at least one of the foregoing fuels. The preferred fuel is based upon the types of equipment employed, with lighter fuels, i.e., those that may be more readily vaporized and/or conventional fuels, which are readily available to consumers being generally preferred.

Processing or reforming of hydrocarbon fuels such as gasoline may provide an immediate fuel source for rapid start up of the fuel cell and also protect the fuel cell by breaking down long chain hydrocarbons and removing impurities. Fuel reforming may include mixing fuel with air, water and/or steam in a reforming zone before entering the reformer system, and converting a hydrocarbon such as gasoline or an oxygenated fuel such as methanol into hydrogen ($H_2$) and carbon monoxide (CO), along with carbon dioxide ($CO_2$) methane ($CH_4$), nitrogen ($N_2$), and water ($H_2O$). Approaches to reforming include steam reforming, partial oxidation, dry reforming, and combinations thereof. Both steam reforming and dry reforming are endothermic processes, while partial oxidation is an exothermic process.

Accordingly, a SOFC may be used in conjunction with a fuel reformer to convert a hydrocarbon-based fuel to hydrogen and carbon monoxide (the reformate) usable by a fuel cell. Preferably, the reformer has a rapid start, a dynamic response time, and excellent fuel conversion efficiency. It is also preferred for the reformer to have a minimal size and reduced weight, as compared to other power sources. However, reformers operate at temperatures that are typically higher than about 600° C., and may even exceed 1000° C. At lower temperatures, for example during start-up, deposition of carbonaceous matter, or soot, upon the catalyst may adversely affect the reformer's efficiency, reduce reformer life, and/or damage fuel cell components. Accordingly, it is beneficial to reduce the time required by a reformer and/or fuel cell system to reach an operational temperature.

Of the various types of reformers available, the type of reformer technologies preferred depend in part on the type of fuel to be used. Steam reformers (SR) are generally employed for converting methanol to hydrogen. Partial oxidation (PDX) reformers are generally employed for converting gasoline to hydrogen and carbon monoxide.

Steam reforming systems involve the use of a fuel and steam ($H_2O$) that is reacted in heated tubes filled with catalysts to convert the hydrocarbons into principally hydrogen and carbon monoxide. The steam reforming reactions are endothermic; thus the steam reformer reactors are designed to transfer heat into the catalytic process. An example of the steam reforming reaction is as follows:

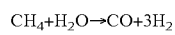

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 600° C. to about 1200° C., and preferably, about 700° C. to about 1050° C. Catalysts have been used with partial oxidation systems to promote conversion of various low sulfur fuels into synthesis gas. The use of a catalyst may result in acceleration of the reforming reactions and also enable the use of lower reaction temperatures than would otherwise be required in the absence of a catalyst. An example of the partial oxidation reforming reaction is as follows:

$$CH_4 + \tfrac{1}{2}O_2 \rightarrow CO + 2H_2$$

U.S. Pat. No. 2,892,693, the disclosure of which is incorporated herein by reference, discloses a method for producing carbon monoxide and hydrogen from gaseous hydrocarbons in which steam is reacted with the hydrocarbon at an elevated pressure over a catalyst to effect partial conversion of the hydrocarbon, followed by reaction of the unconverted hydrocarbon contained in the effluent from the steam-hydrocarbon reforming reaction with oxygen in a zone of partial combustion.

Dry reforming involves the creation of hydrogen and carbon monoxide in the absence of water using, for example, carbon dioxide as the oxidant. Dry reforming reactions, like steam reforming reactions, are endothermic processes. An example of the dry reforming reaction is depicted in the following reaction:

$$CH_4 + CO_2 \rightarrow 2CO + 2H_2$$

Practical reformer systems may include a combination of these idealized processes. Thus, a combination of air, water and/or recycled engine exhaust gas may be used as the oxidant in the fuel reforming process.

SUMMARY OF THE INVENTION

The present invention is directed to a fuel reformer catalyst comprising a substrate, and disposed thereon a carrier and a combination of at least two metals selected from the group consisting of Rh, Ni, Ir, Pd, Pt, Au and combinations thereof. Rh is present in the catalyst in an amount not exceeding about 0.5 wt. %, based on the total combined weight of the metals and the carrier.

BRIEF DESCRIPTION OF THE DRAWINGS

FIG. 1 is a schematic representation of a two-stage reformer catalyst in accordance with the present invention, wherein the first stage is proximate the fuel inlet and the second stage is proximate the reformate outlet of a reactor vessel (not shown).

DESCRIPTION OF THE PREFERRED EMBODIMENTS

As disclosed in U.S. Pat. No. 6,832,473, the disclosure of which is incorporated herein by reference, a fuel reformer comprises a substrate and a catalyst, which can be applied to the substrate in various ways, for example, by washcoating employing the use of a carrier, imbibition, impregnation, physisorption, chemisorption, or precipitation. Washcoating is a convenient preferred means of applying the catalyst to the substrate.

The reformer substrate is preferably capable of operating at temperatures up to about 1200° C. and of withstanding reducing and oxidizing environments containing, for example, hydrocarbons, hydrogen, carbon monoxide, water, oxygen, sulfur and sulfur-containing compounds, combustion radicals such as hydrogen and hydroxyl ions, and carbon particulate matter. In addition, the substrate must have sufficient surface area and structural integrity to support the desired catalytically active metals and carrier.

Materials that can be used for the reformer substrate include alumina, zirconia, lanthanum oxide, cordierite, mullite, silicon carbide, and metals such as stainless steel, aluminum, or stainless steel or aluminum alloyed with chromium, yttrium and the like, as well as oxides, alloys, cermets, and mixtures comprising at least one of the foregoing materials. Preferred ceramic substrates include spinel, cordierite, zirconia-mullite, titanium aluminate, calcium aluminate, γ-, θ-, α-, and δ-alumina, alumina stabilized by La, Ba, Mg, or Ca, zirconium-toughened alumina (ZTA), ceramics containing at least 25 wt. % $ZrO_2$, and combinations thereof. Particularly preferred substrates include metal-stabilized γ-alumina, zirconium-toughened alumina (ZTA), ceramics containing at least 25 wt. % $ZrO_2$, and combinations thereof.

Although the reformer substrate can have any size or geometry, the size and geometry are preferably chosen to optimize the surface area in the given catalytic converter design parameters. The reformer substrate can have an open cell foam structure, or an extruded honeycomb cell geometry, with the cells being any multi-sided or rounded shape, with substantially square, hexagonal, octagonal or similar geometries preferred for reasons of increased surface area and structural integrity. The substrate is formed into a cell structure with a plurality of cells arranged in a honeycomb pattern using a foam process, and the like.

Additives to the substrate may include, for example, oxygen storage compounds such as $CeO_2$ or $CeO_2$—$ZrO_2$ solid solution.

Reformer catalyst materials include metals, such as nickel, platinum, palladium, rhodium, iridium, gold, osmium, ruthenium, and the like, and oxides, mixtures, and alloys comprising the foregoing metals. Preferably, the metal is selected from among the platinum group metals (PGM): platinum (Pt), iridium (Ir), palladium (Pd), and rhodium (Rh), and, in addition, gold (Au). All of the PGMs are expensive; however, as shown below, they vary greatly in cost, Ir being the least expensive, Rh by far the most expensive:

| Metal | Cost ($/g as of Feb. 14, 2006) |
|-------|-------------------------------|
| Pt    | 1015                          |
| Ir    | 205                           |
| Pd    | 278                           |
| Rh    | 3050                          |

Despite its high cost, Rh is included, typically at a concentration of about 1-2 wt. %, based on the total combined weight of Rh and carrier, in currently preferred reformer catalysts. It would be highly desirable to reduce substantially the amount of Rh, even to zero, in the catalyst formulation.

The reformer catalyst of the present invention preferably includes at least one PGM, Ir, Pd, and Pt, or Au, and combinations thereof, each metal being present in an amount of preferably about 0.1 wt. % to about 10 wt. %, more preferably about 0.5 wt. % to about 5 wt. %, most preferably about 1 wt. % to about 2 wt. %, based on the total weight of the total combined weight of metals and carrier.

In addition to the PGM components, the catalyst may also include Ni in an amount preferably of about 0.1 wt. % to about 20 wt. %, more preferably about 1 wt. % to about 10 wt. %, most preferably about 5 wt. %, based on the total weight of metals and carrier.

Metal loadings, expressed a grams of total metal per cubic foot of substrate (g/ft$^3$), can range from about 1 to 500 g/ft$^3$, with a preferred range of about 10 to 250 g/ft$^3$, and a more preferred range of about 50 to 120 g/ft$^3$. Too low a metal loading does not lead to sufficient catalytic activity, while no benefit results from additional metal above a certain effective amount.

Suitable carriers include transitional metal oxides, such as alumina ($Al_2O_3$), including gamma, alpha, delta, or theta phases, silica ($SiO_2$) in either quartz, cristobalite, or tridymite forms, zirconia ($ZrO_2$) In either the monoclinic or tetragonal form, oxides of lanthanum (La), yttrium (Y), cerium (Ce), praseodymium (Pr), neodymium (Nd), gadolinium (Gd), ytterbium (Yb), or scandium (Sc). Combinations of these are possible, including incorporation of oxides of magnesium (Mg), calcium (Ca), strontium (Sr) or barium (Ba), to form compounds with spinel, magnetoplumbite, hexyluminate, perovskite, or fluorite structures, of general formula $A_wB_xC_yD_zO_n$, in which A, B, C, D is any of the oxides mentioned above, O is oxygen, and w, x, y, z, and n are molar quantities required for stoichiometric balance. Examples of suitable compounds include θ- or δ-alumina, monoclinic zirconia, magnesium spinel ($MgAl_2O_4$), lanthanum hexyluminate $LaAl_{11}O_{18}$, alumina mixed with ceria-zirconia-lanthana mixed oxide, and other combinations.

The carrier can have a surface area 1 to over 300 square meters per gram (m$^2$/g), preferably about 10 to 200 m$^2$/g, more preferably about 35 to 70 m$^2$/g. A lower surface area may not provide enough surface to carry the active metal, while a higher surface area may result in a carrier more prone to sintering and loss of surface area. While particle size of the carrier is not important, a preferred range is about 1 to 20μ, more preferably, about 4 to 9μ.

In one embodiment of the present invention, a reformer catalyst comprises a substrate, and disposed thereon a combination of at least two metals selected from the group consisting of Rh, Ni, Ir, Pd, and Pt, wherein the Rh is present in the catalyst in an amount not exceeding about 0.5 wt. %, based on the total weight of metals and carrier. A low concentration of Rh of about 0.5 wt %, which results in a substantial reduction in catalyst cost, is sufficient to maintain good catalyst performance and durability.

In another embodiment of the present invention, a reformer catalyst comprises a substrate, and disposed thereon a carrier and a combination of at least two metals selected from the group consisting of Ni, Ir, Pd, Pt, and Au, no Rh being present in the metal combination.

In still another embodiment of the present invention, a reformer catalyst comprises a first stage and a second stage, wherein each of the stages comprises a substrate, and disposed thereon a metal selected from the group consisting of Rh, Ni, Ir, Pd, Pt, and Au, wherein the Rh is present in each stage in a total amount not exceeding about 0.5 wt. %, based on the total combined weight of metals and carrier. The catalyst is enclosed in a reactor vessel provided with an inlet for fuel and an outlet for product reformate, the first and second stages of the catalyst being disposed proximate the inlet and outlet, respectively. An illustrative example of a two-stage reformer catalyst that includes Pt or Ir in the first stage and Ir—Ni or Pd—Ni in the second stage is schematically depicted in FIG. 1.

The first stage of the reformer catalyst preferably comprises a metal selected from the group consisting of Ir, Pt, and combinations thereof, Ir and Pt each being present in an amount of about 0.1 wt. % to about 10 wt. %, based on the total combined weight of the first stage metals and carrier. More preferably, Ir is present in an amount of about 10 wt. %, and Pt is present in an amount of about 5 wt. %, based on the total combined weight of the first stage metals and carrier.

The second stage catalyst preferably comprises a metal selected from the group consisting of Rh, Ni, Ir, Pd, Pt, Au, and combinations thereof, wherein the Rh is present in said second catalyst in an amount not exceeding about 0.5 wt. %, based on the total combined weight of the second stage metals and carrier. More preferably, the second stage catalyst comprises about 0.5 wt. % Rh.

In a further embodiment, the second stage catalyst comprises a metal selected from the group consisting of Ni, Ir, Pd, Pt, Au, and combinations thereof, the Ir, Pd, Pt, Au, and combinations thereof being present in an amount that is preferably about 0.1 wt. % to about 10 wt. %, based on the total combined weight of the second stage metals and carrier. More preferably, the Ir, Pd, Pt, Au, and combinations thereof are present in an amount of about 1 wt. % to about 2 wt. %, based on the total combined weight of the second stage metals and carrier. Ni is present in an amount that is preferably about 0.1 wt. % to about 20 wt. %, more preferably about 5 wt. %, based on the total combined weight of the second stage metals and carrier.

The two-stage reformer catalyst of the present invention, which produces advantages in catalyst durability and hydrogen selectivity, is widely applicable to fuel reformer processes, including catalytic partial oxidation (POX), steam reforming (SR), and autothermal reforming (ATR) processes.

Catalyst Preparation

A comparison reformer catalyst and several illustrative examples of reformer catalysts in accordance with the present invention were prepared as described below:

1) 1 wt. % Rh (Comparison)

4.77 g rhodium nitrate (10.58 wt. % Rh) was mixed with 50-60 g deionized water, and the resulting solution was added to 50 g dry θ-alumina (5 wt % Ba modified) powder. This mixture was then ball milled to give a slurry having a pH of about 3.5-4.0 and containing 30-50 wt. % solids, the average particle size being 5 □m. This slurry was used to washcoat a 20 PPI ZTA foam substrate.

2) 2 wt. % Ir-2 wt. % Ni (Invention)

1.96 g iridium (IV) chloride hydrate (52.93 wt. % Ir, from Strem Chemicals) and 4.56 g $Ni(Ac)_2 \cdot 4H_2O$ (from Alfa Aesar) were dissolved in 55 g deionized water. The resulting solution was mixed with 50 g $La_2O_3$ powder, with a small amount of alumina as a binder. The mixture was milled to provide a slurry, which was applied to the 20 PPI ZTA substrate by washcoating.

3) 1 wt. % Pd-5 wt. % Ni (Invention)

3.38 g palladium nitrate (14.77 wt. % Pd) and 10.5 g nickel acetate tetrahydrate were dissolved in 60 g deionized water. The resulting solution was mixed with 50 g alumina powder, and the mixture was milled to give a slurry having a pH of about 3.5-4.0 and containing 35-40 wt. % solids, the average particle size being 5 μm. This slurry was used to washcoat the 20 PPI ZTA substrate.

4) 5 wt. % Pt (Invention)

9.75 g platinum nitrate (25.64 wt. % Pt) was dissolved in 60 g deionized water, and the resulting solution was mixed with 50 g alumina powder. This mixture was milled to produce a slurry that was used to coat a 45 PPI ZTA foam substrate (length ⅛", diameter 1").

5) 0.5 wt. % Rh-1 wt. % Pd-5 wt. % Ni (Invention)

The method of preparation was similar to that of catalyst 3, except for the metal solution used to make the slurry. 2.36 g rhodium nitrate (10.58 wt. % Rh), 3.38 g palladium nitrate (14.77 wt. % Pd) and 10.5 g nickel acetate tetrahydrate were dissolved in 60 g deionized water. The resulting solution was mixed with 50 g $La_2O_3$ modified γ-alumina to make a slurry for washcoating. The slurry, whose properties were similar to those in catalyst 3, was applied to a 20 PPI ZTA foam substrate and a 400 cpsi 1" (D)×1" (L) zirconia-mullite monolith substrate, respectively.

6) 0.5 wt. % Rh-1 wt. % Pt-5 wt. % Ni (Invention)

The method of preparation was similar to that of catalyst 6, except for the metal solution used to make the slurry. In this formulation, 1.98 g platinum nitrate (25.64 wt. % Pt), 2.32 g rhodium nitrate (10.58 wt % Rh) and 10.5 g nickel acetate tetrahydrate were dissolved in 60 g deionized water. The resulting solution was mixed with 50 g $La_2O_3$ modified γ-alumina to make a slurry for washcoating. A 400 cpsi 1"(D)×1" (L) zirconia-mullite monolith substrate was used.

Catalyst Testing

The catalyst test reactor is a stainless steel vessel with an inner diameter of about 1.25". The catalyst was put in the middle of the vessel, and a blank substrate without washcoat was placed on both the top and the bottom of the catalyst to serve as a mixing brick and heat retainer. Thermocouples were placed at the top, center and bottom of the catalyst to measure temperatures. Catalysts and blank substrates were retained inside the vessel via alumina wrap.

Air flow was controlled by a mass flow controller, and 2007 Certification diesel fuel with added sulfur to 50 ppm was metered with an ISCO syringe pump and heated by a vaporizer before introduction into the reactor. The O/C ratio was 1.15, and the gas space velocity was about 67000/hr. The product gas was analyzed by an on-line gas chromatograph (micro-GC). Reaction temperatures were about 1100-1200° C.

Some of the catalysts were aged prior to testing, the aging process being carried out at 1200° C. in static air for 10 hours.

Desired reaction products for feed to a downstream SOFC include $H_2$ and CO, while undesired reaction products include unconverted or partially converted hydrocarbons, such as methane ($CH_4$), ethane ($C_2H_6$), or ethylene ($C_2H_4$). A downstream SOFC device will operate best with minimal hydrocarbon content in the produced reformate. For example, $CH_4$ concentration should be less than 1%, while total non-methane hydrocarbon concentrations should be less than 0.2%. Assuming that there is no accumulation of material in the reactor, higher concentrations of $H_2$ in the product reformate indicate that lower concentrations of hydrocarbons are present in the reformate, i.e., all hydrogen included in the reactants entering the reactor leaves the reactor converted to $H_2$ or $H_2O$, or partially converted to hydrocarbons.

A small change in $H_2$ concentration could indicate a significant increase in hydrocarbon concentration, from the perspective of the SOFC hydrocarbon requirement. For example, a 2% drop in $H_2$ product concentration, e.g., from 21% to 19%, would correspond to an increase in $CH_4$ concentration of 1%, or an increase in $C_2H_6$ concentration of 0.67%, or some intermediate combination of each. A decrease in $H_2$ concentration of more than 1% would indicate that the reformate is no longer suitable for SOFC feed, all other factors related to $H_2$ production being the same. Consequently, only small differences in catalyst selectivity for $H_2$ production can result in large differences in the performance of a downstream SOFC device, so even a small performance enhancement, for example, from 20% to 20.5%, has significance.

TABLE 1 following contains the test results for several catalysts of the present invention, compared with those from a 1 wt. % $Rh/Al_2O_3$ control catalyst: showing the amount of hydrogen in the reformate product after 2 hours reaction time:

TABLE 1

| Catalyst | Metals | % $H_2$ (after 2 hr) (POX) | % $H_2$ (after 2 hr) (ATR, $H_2O/HC$ = 1:5) |
|---|---|---|---|
| C-1 | 1% Rh (Control) | 20.2 | 20.3 |
| I-1 | 2% Ir—2% Ni | 19.1 | 20.3 |
| I-2 | 1% Pd—5% Ni | 19.9 | 20.7 |
| I-3 | 2% Ir—2% Ni, 5% Pt first stage | 20.5 | 21.3 |
| I-4 | 1% Pd—5% Ni, 5% Pt first stage | 20.8 | 21.6 |

As shown by the results in TABLE 1, the Ir—Ni catalyst I-1 and the Pd—Ni catalyst I-2 showed similar PDX and ATR performance compared to control catalyst C-1 containing 1 wt. % Rh. In the ATR process just described, the $H_2O:HC$ ratio was 1:5.

Catalysts I-3 and I-4 are analogous to catalysts I-1 and I-2, respectively, but each further includes a first stage comprising 5 wt. % Pt. In these dual stage test catalysts, the first stage had a length of ⅛ inch, the second stage a length of 1 inch (cf. FIG. 1).

As shown by the data in TABLE 1, the two-stage configuration of catalysts I-3 and I-4 produced a significant improvement in hydrogen generation than their single-stage counterparts, especially in the water-containing ATR process. In addition, the dual stage catalysts of the present invention showed improved stability.

TABLE 2 following contains hydrogen production test data for a 2% Ir-2% $Ni/La_2O_3$ second-stage catalyst I-5, along with results for dual stage catalysts I-6 and I-7 containing, respectively, 5% Pt and 10% Ir first-stage catalysts. The use of the first-stage Pt-containing catalyst I-6 enhanced the hydrogen concentration from below 18.1% to about 20.5%. The use of the first-stage Ir-containing catalyst I-7 also led to an enhancement of hydrogen concentration compared with the I-5 single stage catalyst, although it was slightly lower than that obtained with the Pt catalyst. The use of Ir in the catalyst is of interest because it is much less expensive than Pt. Possible improvements in the performance of the Ir-containing first stage catalyst are possible through optimization.

TABLE 2

| Catalyst | First-stage metals | Second-stage metals | % $H_2$ (after 2 hr) |
|---|---|---|---|
| I-5 | None | 2% Ir—2% Ni | 18.1 |
| I-6 | 5% Pt | 2% Ir—2% Ni | 20.5 |
| I-7 | 10% Ir | 2% Ir—2% Ni | 19.8 |
| I-8 | 5% Pt | 5% Ni | 19.6 |
| I-9 | None | 1% Pd—5% Ni | 20.3 |
| I-10 | 5% Pt | 1% Pd—5% Ni | 21.0 |

Dual stage catalyst I-8, which includes a 5% Pt first-stage and a 5% Ni second stage catalyst, also gave improved hydrogen production relative to single stage catalyst I-5.

A Ni-only catalyst cannot be used as a POX catalyst because it is hard to light off, and carbon deposition on catalyst presents a serious problem. If a Pt catalyst is put in front of it, the Ni-only catalyst can light off but degrades very quickly, most likely because of coke deposition. However the degradation problem is overcome by inclusion of a small amount of a metal such as Pt, Pd, Ir, Au, or Rh in the Ni catalyst, which results in the activity of the catalyst being maintained.

Modifying the Ni-containing second-stage catalyst I-8 by the addition of Pd to give catalyst I-9 resulted in an increase in hydrogen concentration. Addition of a 5% Pt first-stage catalyst to catalyst I-9, resulting in catalyst I-10, resulted in a further increase in hydrogen concentration.

The data in TABLE 3 following represent hydrogen production data obtained with 1% Pd-5% Ni catalyst I-11 comprising a foam substrate. Inclusion of 0.5 wt. % Rh in I-11 to give catalyst I-12 resulted in a substantial enhancement in hydrogen concentration.

TABLE 3

| Catalyst * | Metals | % $H_2$ (after 2 hr) |
|---|---|---|
| I-11 | 1% Pd—5% Ni | 19.9 |
| I-12 | 0.5% Rh—1% Pd—5% Ni | 21.1 |

* Catalysts were aged for 10 hr at 1200° prior to testing

TABLE 4 following contains comparative hydrogen production data for 2% Pd-5% Ni catalyst I-13 and 0.5% Rh-1% Pd-5% Ni catalyst I-14, both comprising a monolith substrate, showing the amount of hydrogen in the reformate product after reaction times of 2 hours and 5 hours. At the shorter reaction time, both catalysts yielded a similar concentration of hydrogen. At the longer reaction time, however, the hydrogen concentration from catalyst I-13 underwent a substantial decrease, while that from the Rh-containing catalyst was substantially unchanged. The Rh—Pt—Ni combination in catalyst I-15 produced the highest hydrogen concentration in the product.

Thus, in addition to its beneficial effect on hydrogen generation, the inclusion of a small amount of Rh in the catalyst of the present invention resulted in improved durability, presumably as a consequence of improved resistance of the catalyst to sulfur poisoning and coke formation.

TABLE 4

| Catalyst * | Metals | % $H_2$ (after 2 hr) | % $H_2$ (after 5 hr) |
|---|---|---|---|
| I-13 | 2% Pd—5% Ni | 21.3 | 19.9 |
| I-14 | 0.5% Rh—1% Pd—5% Ni | 21.3 | 21.2 |
| I-15 | 0.5% Rh—1% Pt—5% Ni | 22.0 | 22.0 |

* Catalysts were aged for 10 hr at 1200° prior to testing

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for producing a hydrogen-containing reformate which comprises
    contacting a hydrocarbon fuel with a two-stage catalyst, contained within a reactor vessel having an inlet for fuel and an outlet for product reformate, which comprises
    a first stage, which is disposed proximate said inlet of said vessel, comprising a substrate having disposed thereon a composition consisting of a carrier and Pt,
    a second stage, which is disposed proximate to said outlet of said vessel, comprising Ni with Ir, Pd, or a combination thereof, and optionally Rh, wherein said Rh, if present, is in an amount not exceeding about 0.5 wt %, based on the total combined weight of said metals and said carrier, said Ni is present in an amount of about 0.1 wt % to about 20 wt %, based on the total weight of said metals and said carrier; and said are Ir, Pd, or the combination thereof present in an amount of about 0.1 wt % to about 10 wt %, based on the total weight of said metals and said carrier; and
    conducting catalytic partial oxidation (POX), steam reforming (SR) or autothermal reforming (ATR) to give the hydrogen-containing reformate which has a high hydrogen content of greater than 20% $H_2$ by volume.

2. The method of claim 1, wherein the catalytic partial oxidation is conducted at a temperature in the range of 600 to 1200° C.

3. The method of claim 1, wherein the catalytic partial oxidation is conducted at a temperature in the range of 700 to 1050° C.

4. The method of claim 1, wherein said Rh is present in an amount of 0.5 wt %, based on the total weight of said metals and said carrier.

5. The method of claim 1, wherein said Ni is present in an amount of about 1 wt % to about 10 wt %, based on the total weight of said metals and said carrier.

6. The method of claim 1, wherein said Ni is present in an amount of about 5 wt %, based on the total weight of said metals and said carrier.

7. The method of claim 1, wherein said Rh is present in an amount of about 0.5 wt %, based on the total weight of said metals and said carrier, said Pt is present in an amount of about 1 wt %, based on the total weight of said metals and said carrier, and said Ni is present in an amount of 5 wt %, based on the total weight of said metals and said carrier.

8. The method of claim 1, wherein said Ir, Pd, Pt, or the combination thereof is present in an amount of about 0.5 wt % to about 5 wt %, based on the total weight of said metals and said carrier.

9. The method of claim 1, wherein said Ir, Pd, Pt, or the combination thereof is present in an amount of about 1 wt % to about 2 wt %, based on the total weight of said metals and said carrier.

10. The method of claim 1, wherein said substrate is selected from the group consisting of spinel, cordierite, zirconia-mullite, titanium aluminate, calcium aluminate, γ-, θ-, α-, and δ-alumina, alumina stabilized by La, Ba, Mg, or Ca, zirconium- toughened alumina (ZTA), and combinations thereof.

11. The method of claim 10, wherein said substrate is selected from the group consisting of metal-stabilized γ-alumina, zirconia-mullite, zirconium- toughened alumina (ZTA), and combinations thereof.

12. The method of claim 1, wherein the carrier and said combination of said metals comprise a washcoat, said washcoat being applied to said substrate.

13. The method of claim 1, wherein said Ir, Pt, or the combination thereof each present in an amount of about 0.1 wt % to about 10 wt %, based on the total weight of said first stage metals and said carrier.

14. The method of claim 1, wherein said Ir is present in an amount of about 10 wt %, based on the total weight of said first stage metals and said carrier.

15. The method of claim 1, wherein said Pt is present in an amount of about 5 wt %, based on the total weight of said first stage metals and said carrier.

16. The method of claim 1, which further comprises feeding the hydrogen-containing reformate to a solid oxide fuel cell.

17. A method for increasing the percent of hydrogen content in a hydrogen-containing reformate resulting from catalytic partial oxidation or autothermal reforming, which comprises; and conducting catalytic partial oxidation (POX), steam reforming (SR) or autothermal reforming (ATR) with a two-stage catalyst, contained within a reactor vessel having an inlet for fuel and an outlet for product reformate, which comprises a first stage, which is disposed proximate said inlet of said vessel, comprising a substrate having disposed thereon a composition consisting of a carrier and Pt, a second stage, which is disposed proximate to said outlet of said vessel, comprising Ni with Ir, Pd, or a combination thereof, and optionally Rh, wherein said Rh, if present, is in an amount not exceeding about 0.5 wt %, based on the total combined weight of said metals and said carrier, said Ni is present in an amount of about 0.1 wt % to about 20 wt %, based on the total weight of said metals and said carrier; and said Ir, Pd, or the combination thereof present in an amount of about 0.1 wt % to about 10 wt %, based on the total weight of said metals and said carrier to give the hydrogen-containing reformate which has a high hydrogen content of greater than 20% $H_2$ by volume.

* * * * *